Nov. 2, 1965     R. S. WILKES     3,215,252
MATERIAL CONVEYING AND DISTRIBUTING DEVICE
Filed Feb. 10, 1964     6 Sheets-Sheet 1
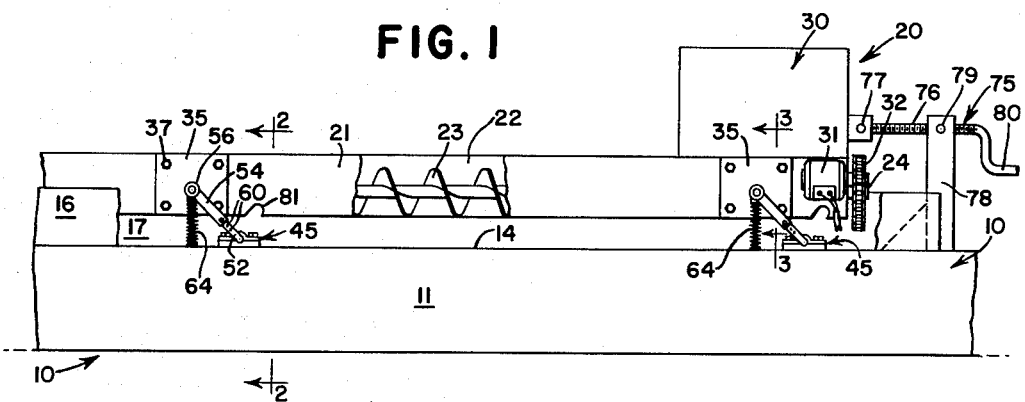
INVENTOR.
RAYMOND S. WILKES
BY William A. Murray
ATTORNEY Nov. 2, 1965  R. S. WILKES  3,215,252
MATERIAL CONVEYING AND DISTRIBUTING DEVICE
Filed Feb. 10, 1964  6 Sheets-Sheet 2

INVENTOR.
RAYMOND S. WILKES
BY William A. Murray
ATTORNEY

Nov. 2, 1965  R. S. WILKES  3,215,252
MATERIAL CONVEYING AND DISTRIBUTING DEVICE
Filed Feb. 10, 1964  6 Sheets-Sheet 3
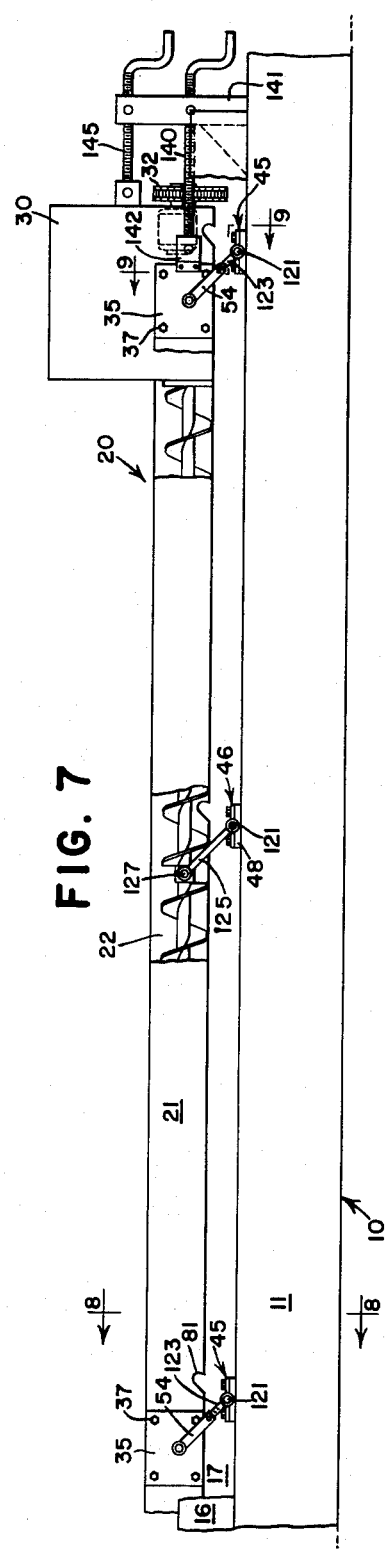
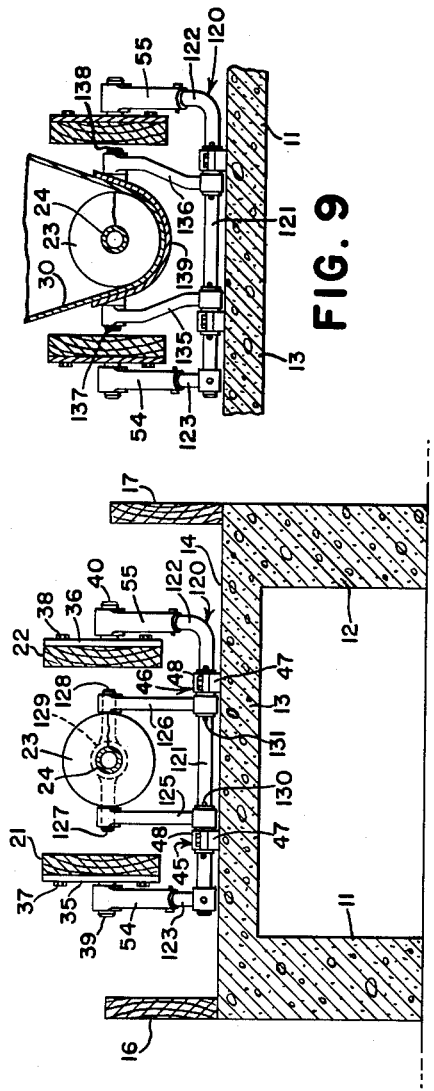
INVENTOR.
RAYMOND S. WILKES
BY *William A. Murray*
ATTORNEY

INVENTOR.
RAYMOND S. WILKES

Nov. 2, 1965   R. S. WILKES   3,215,252
MATERIAL CONVEYING AND DISTRIBUTING DEVICE
Filed Feb. 10, 1964   6 Sheets-Sheet 5
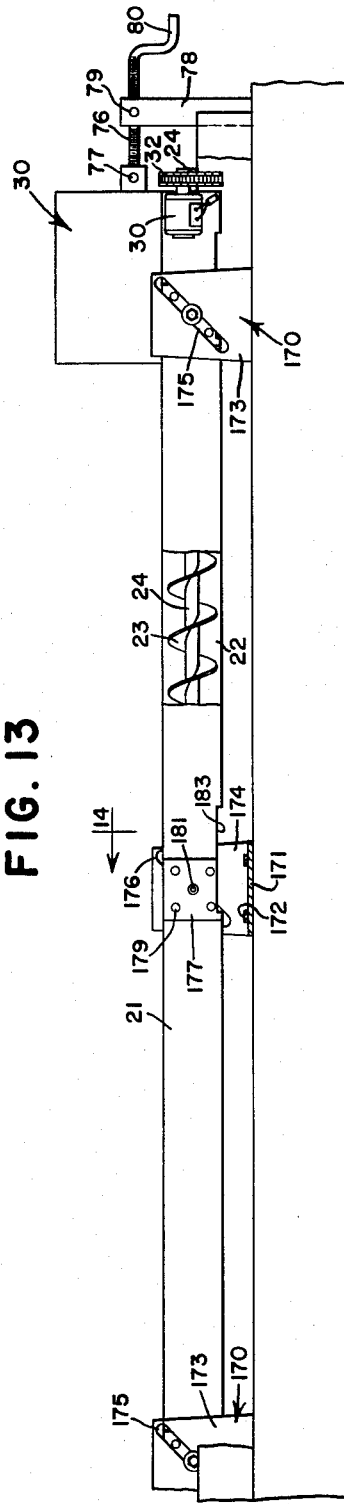
INVENTOR.
RAYMOND S. WILKES
BY William A. Murray
ATTORNEY Nov. 2, 1965   R. S. WILKES   3,215,252
MATERIAL CONVEYING AND DISTRIBUTING DEVICE
Filed Feb. 10, 1964   6 Sheets-Sheet 6
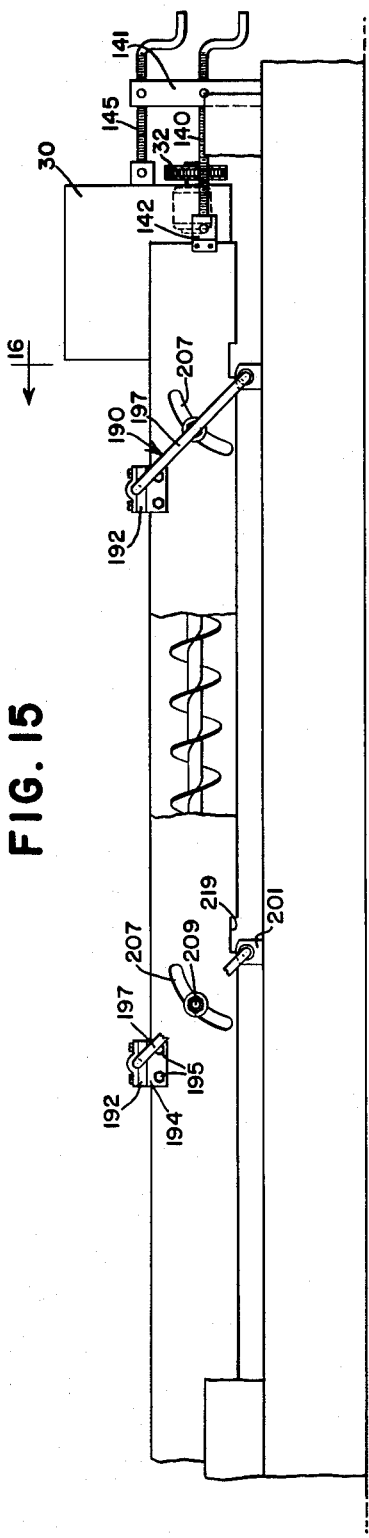
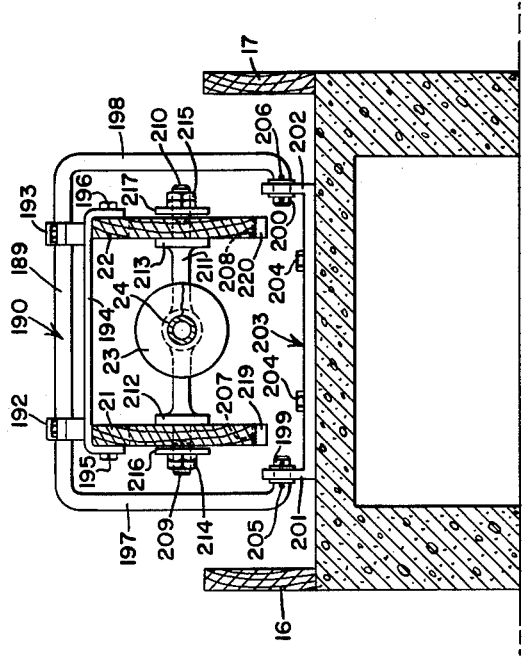
*INVENTOR.*
RAYMOND S. WILKES
BY
ATTORNEY

United States Patent Office 3,215,252
Patented Nov. 2, 1965

3,215,252
MATERIAL CONVEYING AND DISTRIBUTING DEVICE
Raymond S. Wilkes, Moline, Ill., assignor to Deere & Company, Moline, Ill., a corporation of Delaware
Filed Feb. 10, 1964, Ser. No. 343,784
28 Claims. (Cl. 198—64)

This invention relates to a material conveying device used primarily for the purpose of feeding livestock. Still more particularly this invention relates to a structure for supporting the device that may be adjustable to raise and lower the device.

One of the conventional methods of feeding livestock is to deliver feeding material and distribute it lengthwise of a long bunk or trough so that the livestock may eat from the material from opposite sides of the bunk or trough. The normal method of feeding the material is by an auger disposed lengthwise of the trough so as to deliver material from an intake end, normally situated adjacent a feeder hopper, to a remote end at the end of the trough. The auger may or may not have a tube surrounding it depending upon the type of material to be discharged as well as the type of feeding arrangement desired. However, one of the more common type of auger feeding arrangements is to have a pair of boards or walls offset on opposite sides of the auger that retains the material discharged by the auger within the confines of the boards. In this type of arrangement, the auger will feed material from the hopper and will discharge it immediately adjacent the auger until the material reaches the height of the auger at which time the material forms a trough and the buildup of material may be advanced further from the hopper. Consequently the material will gradually be built up from the hopper end to the remote end. A difficulty with this type of discharge arrangement is that the trough or bunk is normally disposed in a feed lot and the livestock will crowd around the hopper end of the auger and will eat the material as it is discharged from the hopper. Consequently the stronger of the livestock will obtain most of the food while the weaker of the livestock will eat only what is left. Of course, the primary advantage of this type of auger feed arrangement is that without the basic tube or housing surrounding the auger, the entire assembly is relatively cheaply manufactured and also cheaply maintained.

With the above in mind, it is an object of the present invention to provide an auger and material distributing assembly capable of vertical adjustment by increments. By being capable of vertically adjusting the auger, the auger is initially disposed closely adjacent the floor and the material will be easily moved from the hopper end to the remote end at which time the auger may be raised and a second layer of material may be moved from the hopper to the remote end. Therefore, the material is discharged in thin layers on the floor of the trough and consequently the entire trough will have some material therein so that all of the cattle or livestock may feed substantially at the same time thereby eliminating the condition in which the stronger or heavier of the livestock obtains the maximum quantity of food.

It is still a further object of the invention to suspend the entire auger and hopper arrangement as well as the drive mechanism for the auger on a series of longitudinally spaced arms pivotally supported on the supporting structure of the trough and pivotally connected to the auger assembly so that the entire auger assembly may be raised and lowered in response to longitudinal movement of the assembly. Longitudinal adjustment of the entire assembly is made adjacent the hopper end of the assembly by means of extensible and retractable elements that may minutely adjust the entire assembly.

It is still a further object of the invention to adjust the above-described mechanism longitudinally by automatic means in the form of a sensing device disposed at the remote end of the auger and connected to the control device so that as material moves the length of the auger and contacts the sensing device, the sensing device will automatically affect further raising of the auger.

It is still a further object of the invention to provide a second sensing device at the remote end of the auger assembly which will automatically shut off the drive to the auger upon material reaching that sensing device. In the specific arrangement provided, the first sensing device will automatically raise the position of the auger as the material contacts it and the second sensing device shuts off the drive to the auger. An automatic stop or limiting means is provided to automatically disengage the entire suspension control device. Therefore, the feeding of material in the trough by layers is controlled by the first sensing device. However, as the first sensing device creates a situation in which the auger is raised to its maximum position, the automatic shut-off device will affect disengagement of the control device and material will be permitted to move to the second sensing device which, upon contact, will affect the stopping of the operation of the feeding assembly.

It is still a further object of the invention to provide a modification of the suspension for the auger and side walls which permits the auger to be moved independently of the laterally spaced apart side walls so that the side walls may contact the floor of the auger trough and be retained there until the auger has a sufficient amount of material fed between the walls. At this time the walls may be raised and the material be permitted to fall into the outer sides of the trough to be eaten by the livestock.

In a modified form of the invention it is a further proposal and object of the invention to provide means for raising and lowering the bunk feeder that includes basic longitudinal supports for the bunk feeder having inclined slots therein that receive pins connected to the auger assembly structure. The auger assembly structure is adapted to move longitudinally in the manner previously described relative to the other forms of the invention to thereby raise and lower the auger assembly as desired.

Other objects and advantages of the present invention will become apparent to those skilled in the art as the nature of the invention is better understood from the following description and as shown in the accompanying drawings.

FIG. 1 is a side view of the material distributing assembly including a portion of the trough and a portion of the auger and hopper assembly. Portions of the structure are removed for purposes of showing internal mechanisms.

FIG. 2 is a sectional view taken substantially along the line 2—2 of FIG. 1.

FIG. 3 is a sectional view taken substantially along the line 3—3 of FIG. 1.

FIG. 4 is a side view, somewhat similar to FIG. 1, but showing overhead suspension means rather than the floor suspension means of FIG. 1.

FIG. 7 is a side view, somewhat similar to FIG. 1, but showing a further modification of the invention.

FIG. 8 is a sectional view taken substantially along the line 8—8 of FIG. 7.

FIG. 9 is a sectional view taken substantially along the line 9—9 of FIG. 7.

FIG. 10 is a sectional view taken substantially along the line 10—10 of FIG. 2.

FIG. 13 is a side view of a modified form of the invention.

FIG. 14 is a sectional view taken substantially along the line 14—14 of FIG. 13.

FIG. 15 is a side view of a further modified form of the invention.

FIG. 16 is a sectional view taken substantially along the line 16—16 of FIG. 15.

Figure 5:
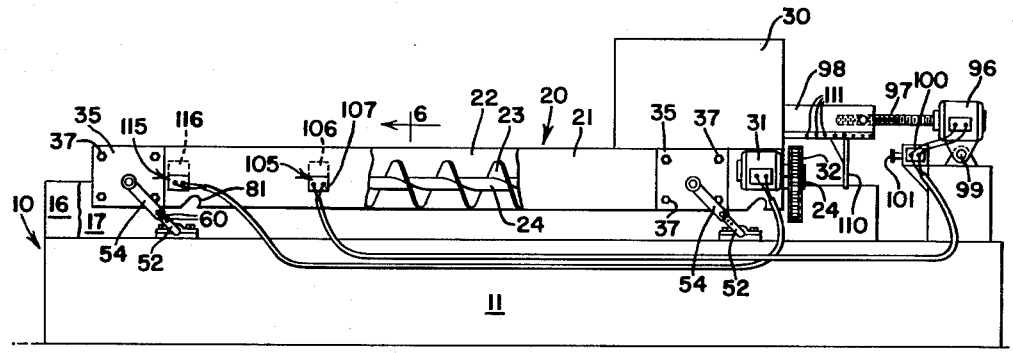
FIG. 5 is a side view, somewhat similar to FIG. 1, but showing a modified form of the invention.

The bunk or trough 10 serves as the main support for the entire material distributing assembly. The bunk is composed of opposed upright concrete side walls 11, 12 interconnected at their upper ends by a table portion 13, the upper surface 14 of which serves as the floor of the bunk or trough. The supporting structure may also include an overhead beam 15 (FIG. 4) which may be a part of an overhead cover for the trough or may be an independently supported beam. Removable side boards 16, 17 extend upwardly from opposite longitudinal edges of the floor 14 and define with the floor the basic U-shaped trough that receives and retains the material discharged by the material handling and distributing assembly, indicated in its entirety by the reference numeral 20.

The material handling and distributing assembly 20 shown in FIGS. 1–3 and in the modified form of the invention in FIG. 4 is composed of a wall structure consisting of a pair of oppositely disposed upright walls 21, 22 spaced laterally outwardly of the centrally located auger 23 having a central drive shaft 24. The entire auger device including the walls 21, 22 as well as the auger 23 is disposed above the floor 14 although closely adjacent thereto. The auger 23 is supported on the wall 21 by means of a plurality of longitudinally spaced auger supports 25, bolted at 26, to the inner surface of the board or wall 21. The support 25 has a journal, indicated in dotted representation at 27, supporting the auger shaft 24. The auger flighting is separated at the point of support 25 to accommodate the supports. Normally the augers are provided in sections approximately ten feet long and consequently the supports 25 will be disposed adjacent the ends of the auger sections. The exact details for the support of the auger 23 by the wall 21, or 22 is not important for purposes of the present invention since such supports are well-known in the art. The auger 23 extends longitudinally over the floor 14 of the bunk or trough 10 and may be of the length required to feed the number of animals or livestock in the feed lot. The side walls or boards 21, 22 also extend the length of the auger 23 and serve to retain the material being fed by the auger 23 within the confines of the walls.

The auger device also includes a material feeding hopper 30, also of conventional size and shape, having the intake end of the auger 23 disposed in its base. The hopper 30 carries drive means in the form of a motor 31 that drives the auger drive shaft 24 by means of a chain drive 32. Generally the hopper 30 and the entire auger assembly operates as a unit and as will presently be described moves vertically and longitudinally as a unit.

Spaced longitudinally along the side walls 21, 22 are vertically disposed plates 35, 36 on the outer surfaces of the walls 21, 22. The plates 35, 36 are bolted at 37, 38 respectively to the walls 21, 22 and have outwardly projecting pivot rods or shafts 39, 40 that serve as horizontal pivot means on the auger device. Supported on the floor 14 and spaced on the order of the plates 35, 36 are journal blocks 45, 46 consisting of one part 47 fixed to the floor 14 and an upper removable part 48 bolted to the lower part. The journals 45, 46 are spaced apart transversely and define transverse horizontal pivot means beneath the auger device. Pivotally carried in each pair of journal blocks 45, 46 is a bight portion 50 of a U-shaped suspension member 51 that also includes opposite upwardly inclined leg portions 52, 53 disposed outside the walls 21, 22 respectively. The arms 52, 53 are telescopingly received in upper arm extensions 54, 55, the latter having hub portions 56, 57 mounted on the transverse pivot rods 39, 40. The arm portions 52, 53 are provided with longitudinally spaced openings, such as is shown at 60, and the arm portions 54, 55 are provided with pins 61, 62 respectively that may be received in the openings 60. Consequently the effective length of the arm structures may be adjusted. This adjustment is considered important since in some instances it is desired to incline one end of the auger relative to the other end.

Reviewing FIG. 10 for the moment, the hub 56 is provided with a depending integral pilot 63 received within a spring 64 supported on a vertically extending pilot 65 projecting from the floor 14. The opposite ends of the spring 64 may be retained on the pilots by suitable pins 66, 67 respectively. The purpose of the springs 64 is to minimize the gravitational effect of the weight of the auger assembly or device. As will later become apparent, in manual manipulation of the entire device, it is desirable to remove some of the load in order to raise the auger device.

Referring now to FIG. 3, there is provided adjacent the underside of the hopper 30 an underlying saddle 70 conforming generally to the shape of the surface of the hopper 30 and having opposite upper depending plate portions 71 bolted at 72 to the inner surfaces of the wall portions 21, 22. Consequently the suspension members 51 at the hopper end of the auger device serve to support the hopper 30 as well as the auger 23. Also it becomes apparent that the entire auger device is suspended by the suspension members 51 above the floor 14 of the trough. It also is apparent that the vertical position of the auger device is dependent upon the longitudinal or angular positions of the arms 52, 53.

Longitudinal control of the device is affected by means of a control device indicated in its entirety by the reference numeral 75 that includes a turn screw 76 articulately connected at 77 to the end wall of the hopper 30. The screw 76 is also supported on an upright support member 78 rigidly fixed to the main supporting structure or the trough 10. A suitable nut, not shown, but located by its articulate connection 79 is provided at the upper end of the support 78 and receives the threaded portion of the turn screw 76. A handle 80 is provided for manual manipulation of the turn screw 76 so that it may be extended and retracted relative to the support 78 and thereby move the entire auger assembly longitudinally as selectively desired.

In operation the auger device will normally be disposed so that the lower edges of the side walls 21, 22 are closely adjacent the floor. Suitable slots, such as at 81 are provided to extend from the lower edges of the walls 21, 22 to accommodate the bite portion 50 of the suspension members and permit the boards to move to a position approaching contact with the floor 14. In operation the motor 31 will be turned on and material will be fed by the auger 23, that is positioned close to the floor 14, so that material will be distributed throughout the length of the auger. By visual inspection as the material approaches the end of the auger, the screw 76 may be adjusted to raise the auger device an increment to provide a second layer of material on the first layer of material. This will continue until the desired height of material is reached.

In the form of the invention shown in FIG. 4, the entire auger assembly or device 20 is suspended from the overhead beam or support 15 by means of longitudinally spaced depending arms 85 parallel to one another and attached to the overhead support 15 by means of horizontal pivot pins 86, the arms 85 are attached at their lower ends to the respective plates 35, 36 and the respective pivot pins 39, 40. Control for the suspension members 85 may also be carried by the overhead support 15 through means of a downwardly extending rigid support 87 having the manually operated turn screw 76 threadedly attached thereto in the manner of the previous form of the invention. The advantage of this type of suspension is that the floor 14 is clear of any operating device and consequently may be kept cleaner. Also the suspension structure will not operate as obstructions to the movement of material longitudinally by the auger 23. The disadvantage of this type of arrangement is, of course, the fact that many bunks or troughs do not have overhead supports and consequently a support, such as at 15, would not always be available. In this form of the invention, springs 88 are provided between the support 15 and the arms 85 to reduce the effect of the gravitational force that must be overcome by the turn screw 76.

Figure 6:
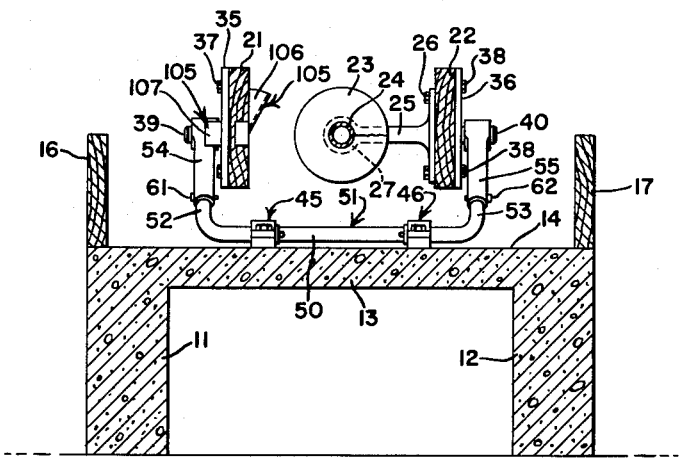
FIG. 6 is a sectional view taken substantially along the line 6—6 of FIG. 5.

Referring now to FIGS. 5 and 6, the modified form of the invention there shown provides a power operated turn screw assembly in the form of a motor 96 having a threaded shaft extension 97 extending therefrom to a nut portion 98 fixed to the hopper 30. The motor 96 is pivotally mounted at 99 to accommodate vertical and logitudinal movement of the assembly 20. The screw portion 97 may be extended or retracted in the portion 98 by driving the motor 96. The motor 96 is controlled in one instance by a limiting switch 100 normally closed but opened by compression of an abutment member 101. The motor 96 is also controlled by a first sensing device 105 adjacent the remote end of the auger device. The first sensing device 105 has a feeler element 106 positioned between the auger 23 and the side wall 21 so that material coming in contact with the feeler element 106 operates a sensing mechanism, shown by the box or housing 107, that effects a timing switch causing the motor 96 to operate a few seconds. In this form of the invention, the auger 23 is carried on the side board 29 by supports 25. The exact nature of the sensing device 105 is not important for the purposes of the present invention since sensing devices may be purchased commercially and any of a series of commercially operated sensing devices would operate in the present system.

In operation, material is fed from the hopper 30 by means of the auger 23 until the material reaches the remote end of the auger device or assembly at which time material on the floor 14 will contact the sensing element 106. The sensing element 106 causes the circuit to close and operate. This causes the screw 97 to thread into the portion 98 and to raise the arm or suspension members 51 and the entire auger device. The material is then fed by the auger to the remote end of the assembly at which time material will again contact the sensing element 106 and the cycle will again continue.

Provided on the portion 98 is a depending abutment plate 110 in longitudinal alinement with the switch element 101. The portion 110 may be adjusted longitudinally along the portion 98 so as to control the ultimate height it is desired to place the material in the trough 10. The shut-off switch 100 operates so that as the suspension members 51 are swung vertically through the operation of the sensing device 105, the abutment member 110 approaches the switch element 101 and upon the abutment member 110 contacting the element 101, the motor 96 will be shut off from further operation.

A second sensing device 115 is provided beyond the first sensing device 105 or between the first sensing device 105 and the extreme remote end of the auger assembly 20. The sensing device 115 has a sensing element 116 provided on the board 21 and between the board 21 and the auger 23 and substantially at the same height as the previous sensing element 106. The sensing device 115 is connected to the motor 31 and operates as a shut-off switch for the motor 31. Material will normally not reach the second sensing device 115 until the abutment 110 opens the circuit to the motor 96 and the material is fed beyond the first sensing device 105 to come into contact with the second sensing device 115. At this time the second sensing device 115 stops the motor 31. Therefore, by providing a suitable location of the abutment member 110, the entire feeding of material from the auger 23 at a desired height will occur automatically.

In the form of the invention shown in FIGS. 7–9, there is provided separate suspension elements for the auger 23 and for the wall members 21, 22. In this form, the side wall 22 is provided with the plate 36 and is suspended by an L-shaped suspension member 120 having a horizontal transverse leg portion 121 carried in the journal blocks 45, 46. The leg portion 121 extends substantially the entire width beneath the wall portions 21, 22 and has an upwardly inclined leg portion 122 connected to the horizontal pivot pin 40 in the manner previously described. The pivot pin 39 is connected to the portion 121 by means of a detachable leg portion 123 fixed at its lower end to the portion 121 so as to be substantially parallel to the leg portion 122. The horizontal leg portion 121 also serves as a pivot shaft for upwardly inclined legs 125, 126, pivotally connected at their upper ends to transverse horizontal pivot pins 127, 128 respectively that are part of a transverse auger support 129. The arms 125, 126 are normally disposed in a parallel manner and may be swung relative to the legs 122, 123. The supports 129 as well as the arms 125, 126 are spaced longitudinally along the auger 23.

Referring now to FIG. 9, the support for the hopper 30 is composed of a pair of arms 135, 136 offset slightly at their upper ends to receive outwardly projecting pivot pins 137, 138 that project outwardly from the sides of a U-shaped saddle support 139 underlying the hopper housing 30. The lower ends of the arms 135, 136 are carried on a leg portion 121 of the suspension member 120 in the manner described relative to the other auger supporting arms. The arms 135, 136 are normally parallel to the arms 125, 126 and are controlled to move longitudinally by the same device controlling the arms 125, 126.

The longitudinal position of the side boards 21, 22 as well as their vertical position is controlled by a turn screw 140 articulately connected to an upright support 141 carried on the main supporting structure or bunk 10. The end of the turn screw 140 is pivotally carried by a bracket 142 bolted to the plate 35 adjacent the end of the side board 21. By turning the turn screw 140 the longitudinal position of the side boards 21, 22 as well as the vertical position thereof may be controlled.

The auger 23 and the hopper 30 are controlled in their longitudinal and vertical positions by means of a turn screw 145 articulately connected to the upper end of the support 141 and also connected to the hopper 30. By turning the screw 145 the longitudinal position of the hopper 30 and auger 23 as well as their vertical positions may be selectively controlled.

In handling small grain particularly, the adjustment of the auger 23 as well as the side walls 21, 22 relative to one another becomes important. In many instances it will be desirable to fill the lower portion of the auger and in many instances it will be desirable to position the side boards 21, 22 closely adjacent the floor so that they will retain the small grain within their confines while the auger builds the level of the grain at a height above the floor 14. The present arrangement will operate to provide this advantageous condition.

Figure 11:
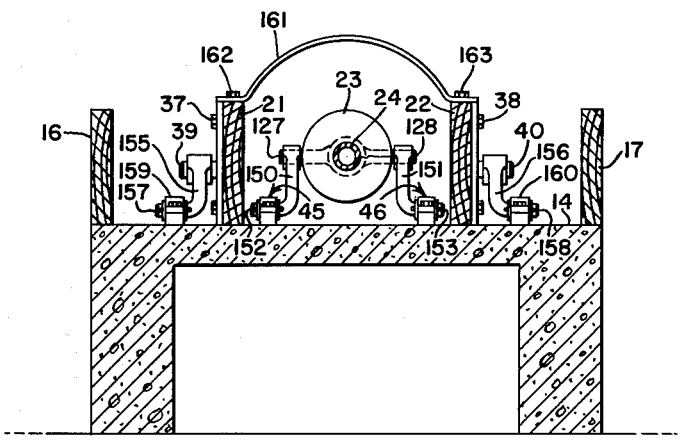
FIG. 11 is a sectional view similar to FIG. 2 showing a modified form of the invention.
Figure 12:
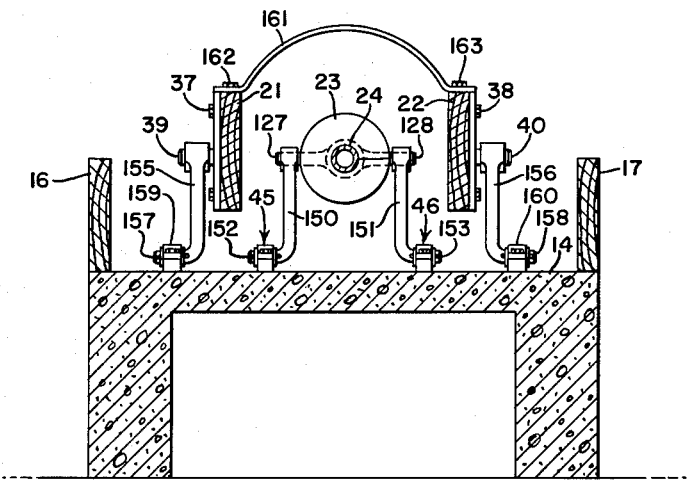
FIG. 12 is a sectional view of the modified form of the invention shown in FIG. 11 showing the parts in a different relation relative to the floor of the bunk.

In the modified form of the invention as shown in FIGS. 11 and 12, the support for the auger 23 consists basically of a pair of L-shaped arms 150, 151 having vertical portions pivotally connected to auger support pivot pins 127, 128 at their upper ends and further having oppositely disposed and outwardly projecting leg portions 152, 153 that in fact serve as horizontal pivot pins journaled in journal supports 45, 46 fixed to the floor 14 of the bunk feeder. It will be noted that the leg portions 152, 153 project outwardly in respect to the auger 23 and consequently the auger may be adjusted completely from its uppermost position to a position closely adjacent the floor 14 of the bunk feeder. The adjustment for the auger 23 and the hopper 30 may be accomplished by the adjusting mechanism at the end of the hopper and in the manner described relative to the modified form of the invention shown in FIGS. 7–9.

The side boards 21, 22 are supported on L-shaped supports 155, 156 having their vertical leg portions pivotally connected at their upper ends to the pivot pins 39, 40 projecting outwardly from the sides of the boards 21, 22. Lower horizontal leg portions 157, 158 are disposed adjacent the floor 14 and project outwardly relative to the side boards 21, 22 and do in fact serve as horizontal pivots journaled on bearings or journal supports 159, 160. Consequently the side boards 21, 22 may be adjusted vertically by adjusting the side boards 21, 22 longitudinally of the bunk feeder. The adjustment of the side boards 21, 22 may be done in the manner described and shown in FIG. 7 relative to that form of the invention. It should be recognized that the L-shaped supports 150, 151, 155, 156 while not having the telescoping or the extensible type legs as shown in the previous forms of the invention could, nevertheless, have such modification if desired. It should also be recognized that the leg portions 152, 153 terminate short or inboard of the inner surfaces of the side boards 21, 22 and consequently the boards 21, 22 may move into a position in which the lower edges thereof contact the surface of the floor 14. A cover panel 161 extends across the spacing between the side walls 21, 22 and substantially the length of the auger, and is bolted, as at 162, 163, to the upper edges of the walls 21, 22. The cover 161 is arched at its center to accommodate relative vertical movement of the auger 23.

In the modified form of the invention shown in FIGS. 11, 12, there is considerable advantage in the fact that the entire retaining structure consisting of the side walls 21, 22 and the overhead cover 161 may completely enclose the auger 23 when the side boards 21, 22 are moved into position of engagement with the floor surface 14. This creates a situation in which the auger 23 may generally fill the area between the side boards 21, 22 without permitting the cattle or other livestock adjacent the bunk from feeding on the material as it is augered. Consequently the entire bunk feeder may be filled with material when the side boards 21, 22 are lowered and upon the bunk being filled, the side boards 21, 22 may be raised to permit the cattle to eat of the augered material. The cover 161 also offers a degree of protection for material left in the bunk should the cattle not desire the full ration that has been offered.

In the form of the invention shown in FIGS. 13, 14, the auger or conveyor structure is similar to that previously described relative to FIGS. 1, 2 and 4. The auger structure is composed of an auger 23 having a pair of oppositely disposed side boards 21, 22 spaced outwardly therefrom with a support 25 extending inwardly from the side board 21 to support the auger shaft 24 centrally between the side boards 21, 22. Since the structure is substantially identical, similar reference numbers are used and further description relative to the basic auger structure is not deemed necessary relative to the present form of the invention.

The auger or conveyor assembly is supported on longitudinally spaced U-shaped structural supports 170. The supports 170 have lower horizontal flat portions 171 bolted at 172 to the floor 14 of the bunk and opposed upright structures 173, 174 projecting upwardly from the flat portions 171 and disposed outboard of the respective side boards 21, 22. The side structural members 173, 174 are provided with inclined slots 175, 176. The outboard sides of the side walls 21, 22 have plates 177, 178, bolted at 179, 180, to the respective side boards having outwardly projecting and internally threaded pivots or guides 185, 186 respectively disposed in the slots 175, 176 to permit a sliding relation of the entire auger or conveyor assembly in the slots 175, 176. Bolts 181, 182 and washers 187, 188 are carried on the outer ends of the guides 185, 186 outboard of the side boards 21, 22. Downwardly opening recesses 183, 184 are provided in the lower edges of the boards 21, 22 to receive the flat portions 171 and permit the side walls 21, 22 to engage the floor surface 14.

Provision is made for moving the entire auger or conveyor assembly longitudinally relative to the basic supports 170 by a means similar to that described and shown in FIGS. 1 and 3. Consequently the guides 185, 186 will move vertically in the slots 175, 176 as the conveyor moves longitudinally. Therefore, the present form of the invention provides a further method of moving the auger assembly vertically in response to longitudinal movement of the auger assembly. It should also be recognized that a further variation will be obvious by merely reversing the location of the pins and slots, i.e., by placing the slot in the side boards 21, 22 and supporting inwardly projecting pins on the side supports 173, 174.

In the modified form of the invention shown in FIGS. 15, 16, side boards 21, 22 are pivotally carried on an overhead bight portion 189 of an inverted U-shaped rod 190, journal supports 192, 193 being provided to receive the bight portion. The supports 192, 193 are supported on an overhead spacer plate 194 extending between the upper edges of the side walls 21, 22 and bolted thereto, as at 195, 196. Depending leg portions 197, 198 of the U-shaped support member have inwardly directed horizontal ends 199, 200 pivotally carried on upwardly projecting legs 201, 202 of a base support 203. The base support 203 is U-shaped and has its bight portion bolted at 204 to the floor 14. Consequently the entire conveyor or auger assembly may be pivoted about the lower ends 199, 200 and consequently the auger assembly may have longitudinal movement and, in response to longitudinal adjustment, be moved vertically. The pivot portions 199, 200 are held in the vertical portions 201, 202 by cotter pins 205, 206.

The side walls 21, 22 have arcuate shaped inclined slots 207, 208 that receive laterally outwardly extending slide pins 209, 210, which are outward projections of an auger support 211, projecting to opposite sides of the auger shaft 24. Upright plate portions 212, 213, integral with the support 211, bear against the inner faces of the side boards 21, 22. The pins 209, 210 are threaded at their outer ends and receive plates 216, 217 respectively, that bear against the outer surfaces of the side walls 21, 22. Nuts 214, 215 lock the plates 216, 217 on the pins 209, 210 and loosely retain side walls 21, 22 for relative movement in respect to the auger 23. Downwardly opening recesses 219, 220 are provided to receive the base 203 so that the lower edges of side walls 21, 22 may engage the floor.

As may be readily evident, relative movement, both vertical and longitudinal, may occur by the structure as disclosed. Longitudinal as well as vertical movement of the side walls may be had by a turnscrew 140 connected at one end of the side board in a manner described relative to the form of invention shown in FIG. 7. Similarly the auger is moved longitudinally by a screw adjustment 145 connected to the hopper 30 in the manner previously described relative to the form of invention shown in FIG. 7. The arcuate slots 207, 208 permit relative movement, without binding between the auger 13 and side boards 21, 22.

While only one main form and four modifications of the present invention have been shown, it should be understood that other forms and variations will occur to those skilled in the art. Therefore, while the present forms of the invention have been shown to concisely illustrate the principles of the invention, it should be understood that there is no intention to limit or narrow the invention beyond the broad concepts set forth in the appended claims.

What is claimed is:

1. A material distributing assembly comprising: longitudinally extending supporting structure including a floor; a material handling and distributing assembly disposed above the floor including an elongated longitudinally extending auger device, an auger feeding hopper at one end thereof, and drive means therefor; a plurality of longitudinally spaced horizontal pivot means on the supporting structure vertically offset from the material handling and distributing assembly; a plurality of longitudinally spaced horizontal pivot means on the handling and distributing assembly and spaced substantially on the order of the spacing of the pivot means on the supporting structure; suspension members extending between the pivots on the supporting structure and the pivots on the handling and distributing assembly for raising and lowering the assembly; and a suspension control device operatively connected to the suspension members for selectively swinging the members longitudinally about the pivots.

2. A material distributing assembly comprising: longitudinally extending supporting structure including a floor; an elongated longitudinally extending auger device disposed above the floor including an auger feeding hopper at one end thereof and auger drive means supported thereon; suspending structure including a plurality of longitudinally spaced elongated suspension members extending between and pivotally connected for longitudinal movement to the supporting structure and the auger device for raising and lowering the device; and an adjustable suspension control operatively connected to the suspension members for selectively swinging the members longitudinally.

3. The invention defined in claim 2 in which the suspending structure has vertical adjusting means for the suspension members whereby the auger device may be selectively inclined from one end to the other.

4. The invention defined in claim 2 in which the supporting structure includes overhead support in respect to the auger device and the suspension members pivotally depend therefrom to the auger device.

5. The invention defined in claim 2 in which the suspension members are vertical arms pivotally connected at their lower ends to the floor of the supporting structure and at their upper ends to the auger device.

6. The invention defined in claim 2 in which the auger device includes an auger and a material retaining wall parallel to and adjacent the auger and the suspension members are connected in part to the auger and in part to the wall, and the suspension control comprises in part of means for longitudinally adjusting the wall-suspending members and in part of means for longitudinally adjusting the auger-suspending members.

7. The invention defined in claim 2 in which the suspension members are U-shaped members with each having a bight portion offset vertically from the auger device and being pivotally supported on the supporting structure and having a pair of vertical legs disposed on opposite sides of the auger device, with each leg being pivotally connected to the auger device.

8. A material distributing assembly comprising longitudinally extending supporting structure including a floor; a material handling and distributing assembly disposed above the floor including an elongated longitudinally extending auger device, suspension means between the supporting structure and the handling and distributing assembly adapted to raise and lower the assembly in response to longitudinal movement of the assembly relative to the supporting structure; and an adjustable suspension control device operatively connected to the assembly for selectively moving the assembly longitudinally.

9. A material distributing assembly comprising longitudinally extending supporting structure including a floor; a material handling and distributing assembly disposed above the floor including an elongated longitudinally extending auger device with a first and second end and adapted to move material from the first to the second end and further adapted to deposit material on the floor; suspension means between the supporting structure and the distributing assembly adapted to raise and lower the assembly in response to longitudinal movement of the assembly relative to the supporting structure; an adjustable control device operatively connected to the assembly for selectively moving the assembly longitudinally; a sensing device at the second end of the auger device above the floor and responsive to contact with material deposited on the floor to effect adjustment of the control device to automatically raise the auger device.

10. The invention defined in claim 9 further characterized by a disengageable connection between the control device and suspension means, and a position-responsive element connected to the connection for effecting disengagement of the control device upon the handling and distributing assembly reaching a maximum longitudinal position.

11. A material distributing assembly comprising longitudinally extending supporting structure including a floor; a material handling and distributing assembly disposed above the floor including an elongated longitudinally extending auger device with a first and second end and adapted to move material from the first to the second end and further adapted to deposit material on the floor; a power source for operating the assembly; suspension means between the supporting structure and the handling and distributing assembly adapted to raise and lower the assembly in response to longitudinal movement of the assembly relative to the supporting structure; a suspension control device operatively connected to the assembly for selectively moving the assembly longitudinally; a first sensing device adjacent the second end of the auger device above the floor and responsive to contact with material deposited on the floor to effect adjustment of the control device to automatically raise the auger device; means limiting the maximum vertical movement of the auger device; and a second sensing device beyond the first sensing device and adjacent the second end for disengaging the power source upon contact with material deposited on the floor.

12. A material distributing assembly comprising longitudinally extending supporting structure including a floor; an elongated longitudinally extending auger; an auger feeding hopper at one end of the auger; drive means for the auger supported on the hopper; material retaining wall structure offset to one side of the auger and extending the length thereof; auger support means extending from the wall structure to the auger and hopper; a plurality of longitudinally spaced horizontal pivot means on the supporting structure vertically offset from the material retaining wall structure; a plurality of longitudinally spaced horizontal pivot means on the wall structure and spaced substantially on the order of the spacing of the pivot means on the supporting structure; rigid suspension members extending between the pivots on the supporting structure and the pivots on the wall structure for raising and lowering the hopper and auger; and an adjustable suspension control device operatively connected to the suspension members for selectively swinging the members longitudinally about the pivots.

13. A material distributing assembly comprising longitudinally extending supporting structure including a floor; an elongated longitudinally extending auger; an auger feeding hopper at one end of the auger; drive means for the auger supported on the hopper; material retaining wall structure offset to one side of the auger and extending the length thereof; auger support means extending from the wall structure to the auger and hopper; a plurality of longitudinally spaced horizontal pivot means on the supporting structure vertically offset from the material retaining wall structure; a plurality of longitudinally spaced horizontal pivot means on the wall structure and spaced substantially on the order of the spacing of the pivot means on the supporting structure; suspension members extending between the pivots on the supporting structure and the pivots on the wall structure for raising and lowering the hopper and auger; an adjustable suspension control device operatively connected to the suspension members for selectively swinging the members longitudinally about the pivots; and a sensing device disposed between the wall structure and auger adjacent the end of the auger remote from the hopper and operatively connected to the control device for automatically raising the auger and hopper upon material coming into contact therewith.

14. A material distributing assembly comprising longitudinally extending supporting structure including a floor; an elongated longitudinally extending auger; an auger feeding hopper at one end of the auger; drive means for the auger supported on the hopper; material retaining wall structure offset to one side of the auger and extending the length thereof; auger support means extending from the wall structure to the auger and hopper; a plurality of longitudinally spaced horizontal pivot means on the support structure vertically offset from the material retaining wall structure; a plurality of longitudinally spaced horizontal pivot means on the wall structure and spaced substantially on the order of the spacing of the pivot means on the supporting structure; suspension members extending between the pivots on the supporting structure and the pivots on the wall structure for raising and lowering the hopper and auger; an adjustable suspension control device operatively connected to the suspension members for selectively swinging the members longitudinally about the pivots; and a sensing device disposed between the wall structure and auger adjacent the end of the auger remote from the hopper and operatively connected to the drive means for the auger for automatically stopping operation of the auger upon material coming into contact therewith.

15. A material distributing assembly comprising longitudinally extending supporting structure including a floor; an elongated longitudinally extending auger; an auger feeding hopper at one end of the auger; drive means for the auger supported on the hopper; material retaining wall structure offset to one side of the auger and extending the length thereof; auger support means extending from the wall structure to the auger and hopper; a plurality of longitudinally spaced horizontal pivot means on the supporting structure vertically offset from the material retaining wall structure; a plurality of longitudinally spaced horizontal pivot means on the wall structure and spacer substantially on the order of the spacing of the pivot means on the supporting structure; suspension members extending between the pivots on the supporting structure and the pivots on the wall structure for raising and lowering the hopper and auger; and a longitudinally extensible and retractable device anchored on the supporting structure and connected to the hopper for selectively swinging the members longitudinally about the pivots.

16. The invention defined in claim 15 further characterized by spring means extending between the suspension members and the supporting structure for resisting the gravitational load on the members due to the weight of the hopper and auger.

17. A material distributing assembly comprising longitudinally extending supporting structure including a floor and longitudinal overhead support means spaced vertically above the floor; an elongated longitudinally extending auger; an auger feeding hopper at one end of the auger; drive means for the auger supported on the hopper; a pair of parallel and upright longitudinally extending walls offset to opposite sides of the auger and extending the length thereof; auger support means extending from at least one of the walls to the auger and hopper; suspension arms pivotally connected for longitudinal swinging and extending between the overhead support and the walls for raising and lowering the hopper and auger; and a longitudinally extensible and retractable device anchored on the supporting structure and connected to the hopper for selectively swinging the arms longitudinally about the pivots.

18. A material distributing assembly comprising longitudinally extending supporting structure including a floor; an elongated longitudinally extending auger; an auger feeding hopper at one end of the auger; drive means for the auger supported on the hopper; a pair of parallel and upright longitudinally extending walls offset to opposite sides of the auger and extending the length thereof; auger support means extending from at least one of the walls to the auger and hopper; suspension arms pivotally connected for longitudinal swinging and extending between the floor and the walls for raising and lowering the hopper and auger; and a longitudinally extensible and retractable device anchored on the supporting structure and connected to the hopper for selectively swinging the arms longitudinally about the pivots.

19. A material distributing assembly comprising longitudinally extending supporting structure including a floor; an elongated longitudinally extending auger; an auger feeding hopper at one end of the auger; drive means for the auger supported on the hopper; material retaining wall structure offset laterally from the auger and extending the length thereof; structure defining horizontal pivot means extending outwardly and laterally from the auger and wall structure; a plurality of longitudinally spaced horizontal pivot means on the supporting structure vertically offset from the auger and material retaining wall structure; rigid suspension members extending between the pivots on the supporting structure and the pivots on the wall structure and auger for raising and lowering the wall structure and auger; and suspension control means adjustably carried on the supporting structure and operatively connected to the suspension members for selectively swinging the members longitudinally about the pivots.

20. A material distributing assembly comprising longitudinally extending supporting structure including a floor; an elongated longitudinally extending auger; an auger feeding hopper at one end of the auger; drive means for the auger supported on the hopper; material retaining wall structure offset laterally from the auger and extending the length thereof; structure defining horizontal pivot means extending outwardly and laterally from the auger and wall structure; a plurality of longitudinally spaced horizontal pivot means on the supporting structure vertically offset from the auger and material retaining wall structure; a plurality of longitudinally spaced horizontal pivot means on the wall structure and spaced substantially on the order of the spacing of the pivot means on the supporting structure; suspension members extending between the pivots on the supporting structure and the pivots on the wall structure and auger respectively for raising and lowering the wall structure and auger independently of one another; and adjustable suspension control means operatively connected to the suspension members for selectively swinging the members longitudinally about the pivots.

21. The invention defined in claim 20 in which the wall structure is an upright wall having a lower edge and the suspension members are arms having a horizontal portion for connection to the horizontal pivot means and rigidly joined vertical portions, the horizontal portions underlie the lower edge, and the wall has upwardly extending slots from its lower edge for accommodating the horizontal portions so that the lower edge may be disposed closely adjacent the floor.

22. The invention defined in claim 8 in which the suspension means includes longitudinally spaced upright supports projecting from the supporting structure and having portions thereof alongside the handling and distributing assembly, and a juncture between the structure and assembly including means defining inclined slots in one, and lateral guide elements disposed in the slots on the other whereby, relative longitudinal movement between them will effect relative vertical movement between them.

23. A material distributing assembly comprising longitudinally extending supporting structure including a floor; a material handling and distributing assembly disposed above the floor including an elongated longitudinally extending auger device; upright supports spaced longitudinally and disposed alongside the handling and distributing assembly and projecting from the supporting structure; suspension means connecting the supports and the handling and distributing assembly including track and guide means, the track means being inclined so as to raise and lower the assembly in response to longitudinal movement of the assembly relative to the supports; and an adjustable suspension control device operatively connected to the assembly for selectively moving the assembly longitudinally.

24. A material distributing assembly comprising longitudinally extending supporting structure including a floor; a material handling and distributing assembly disposed above the floor including an elongated longitudinally extending auger device; upright supports spaced longitudinally and disposed alongside the handling and distributing assembly and projecting from the supporting structure, the supports having inclined slots therein; guide elements projecting laterally from the handling and distributing assembly adapted to seat in the slots to thereby raise and lower the assembly in response to longitudinal movement of the assembly relative to the supports; and an adjustable suspensions control device operatively connected to the assembly for selectively moving the assembly longitudinally.

25. A material distributing assembly comprising longitudinally extending supporting structure including a floor; a material handling and distributing assembly disposed above the floor including an elongated longitudinally extending auger, and a cover over the auger with a pair of depending side walls on opposite sides of the auger having lower longitudinal edges; suspension means between the supporting structure and the handling and distributing assembly adapted to raise and lower the side walls in response to longitudinal movement of the assembly relative to the supporting structure whereby the edges will move between positions closely adjacent the floor and spacedly above the floor; and suspension control means operatively connected to the assembly for selectively moving the assembly longitudinally.

26. A material distributing assembly comprising longitudinally extending supporting structure including a floor; a material handling and distributing assembly disposed above the floor including an elongated longtiudinally extending auger, and a cover over the auger with a pair of depending side walls on opposite sides of the auger having lower longitudinal edges; suspension means between the supporting structure and the handling and distributing assembly adapted to independently raise and lower the auger and side walls in response to longitudinal movement thereof relative to the supporting structure whereby the edges and auger may be moved between positions closely adjacent the floor and spacedly above the floor; and suspension control means operatively connected to the assembly for effecting longitudinal adjustment of the latter.

27. The invention defined in claim 26 in which the cover includes an overhead portion in respect to the auger arched from the side walls so as to accommodate vertical movement of the auger in respect to the cover.

28. A material distributing assembly comprising longitudinally extending supporting structure including a floor; a material handling and distributing assembly disposed above the floor including an elongated longitudinally extending auger device, suspension means including inverted U-shaped structures having depending leg portions on opposite sides of the handling and distributing assembly and pivotally connected at their lower ends to the supporting structure, said structures being connected to the assembly and adapted to raise and lower the assembly in response to longitudinal movement of the assembly relative to the supporting structure; and an adjustable suspension control device operatively connected to the assembly for selectively moving the assembly longitudinally.

References Cited by the Examiner
UNITED STATES PATENTS 3,092,077   6/63   Smoker et al.  ---------- 119—52
3,116,715   1/64   Krumheuer  ---------- 119—53 X SAMUEL F. COLEMAN, *Primary Examiner.*